(12) United States Patent
Kalyanaraman

(10) Patent No.: US 10,726,085 B2
(45) Date of Patent: Jul. 28, 2020

(54) SYSTEMS AND METHODS FOR EVALUATING DIVERSITY OF CONTENT BASED ON CONTENT PROPERTIES

(71) Applicant: Facebook, Inc., Menlo Park, CA (US)

(72) Inventor: Shankar Kalyanaraman, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 470 days.

(21) Appl. No.: 15/215,317

(22) Filed: Jul. 20, 2016

(65) Prior Publication Data

US 2018/0025087 A1  Jan. 25, 2018

(51) Int. Cl.
*G06F 16/00* (2019.01)
*G06F 16/9535* (2019.01)
*G06Q 50/00* (2012.01)
*G06F 16/2457* (2019.01)

(52) U.S. Cl.
CPC .... *G06F 16/9535* (2019.01); *G06F 16/24578* (2019.01); *G06Q 50/01* (2013.01)

(58) Field of Classification Search
CPC ......... G06F 17/30035; G06F 17/30038; G06F 17/3082; G06F 17/30899; G06F 17/3053; G06F 17/30554; G06F 17/30424; G06F 17/30598; G06F 17/30864; G06F 17/30477; G06F 16/24578; G06F 16/9535
USPC ................................................ 707/705–780
See application file for complete search history.

(56) References Cited

U.S. PATENT DOCUMENTS

| | | | | |
|---|---|---|---|---|
| 8,838,583 B1* | 9/2014 | Fox | ..................... | G06Q 30/0207 707/723 |
| 9,195,753 B1* | 11/2015 | King | ................... | G06F 16/9535 |
| 2007/0143345 A1* | 6/2007 | Jones | .................... | G06F 16/444 |
| 2014/0214814 A1* | 7/2014 | Sankar | .............. | G06F 17/30867 707/723 |
| 2014/0258282 A1* | 9/2014 | Piantino | ................. | G06Q 50/01 707/725 |
| 2014/0330818 A1* | 11/2014 | Raina | ..................... | G06Q 30/02 707/723 |
| 2014/0344252 A1* | 11/2014 | Kapoor | .................... | G09B 7/02 707/722 |
| 2015/0186506 A1* | 7/2015 | Vandevoorde | ........ | G01S 5/0284 707/737 |
| 2016/0012053 A1* | 1/2016 | Weening | ............... | G06F 16/435 707/723 |
| 2016/0019298 A1* | 1/2016 | Brodie | .............. | G06F 17/30867 707/734 |
| 2016/0147755 A1* | 5/2016 | Goldberg | ............ | G06F 16/9535 707/723 |
| 2016/0321261 A1* | 11/2016 | Spasojevic | ........ | G06F 16/24578 |
| 2016/0321585 A1* | 11/2016 | Saraswat | .......... | G06Q 10/06311 |

* cited by examiner

*Primary Examiner* — Michelle N Owyang
(74) *Attorney, Agent, or Firm* — Sheppard Mullin Richter & Hampton LLP

(57) ABSTRACT

Systems, methods, and non-transitory computer-readable media can acquire a set of properties associated with a set of content items. A plurality of property combinations can be selected from the set of properties. A plurality of numbers of unique properties associated with the plurality of property combinations can be determined. A diversity metric for the set of content items can be generated based on at least some of the plurality of numbers of unique properties associated with the plurality of property combinations.

15 Claims, 12 Drawing Sheets

300

320

| Segment Length 322 | Author Combinations 324 | Unique Authors 326 |
|---|---|---|
| 1 | X | 1 |
| 2 | XZ | 2 |
| 3 | XZX | 2 |
| 4 | XZXY | 3 |

| Author Combinations 342 | Unique Authors 344 | Minimum Unique Authors 346 |
|---|---|---|
| X, Z, X, Y | 1, 1, 1, 1 | 1 |
| XZ, ZX, XY | 2, 2, 2 | 2 |
| XZX, ZXY | 2, 3 | 2 |
| XZXY | 3 | 3 |

| Unique Authors 362 | Quantities of Times Present 364 | Probability Values 366 |
|---|---|---|
| X | 2 | 2/4 |
| Z | 1 | 1/4 |
| Y | 1 | 1/4 |

FIGURE 3D

SYSTEMS AND METHODS FOR EVALUATING DIVERSITY OF CONTENT BASED ON CONTENT PROPERTIES

FIELD OF THE INVENTION

The present technology relates to the field of data analysis. More particularly, the present technology relates to techniques for evaluating diversity of content based on content properties.

BACKGROUND

Today, people often utilize computing devices (or systems) for a wide variety of purposes. Users can use their computing devices to, for example, interact with one another, access content, share content, and create content. In some cases, users can utilize their computing devices to view, access, interact, or otherwise engage with content, such as multimedia (i.e., media) content. For instance, by utilizing their computing devices, users of a social networking system or service can engage with text, images, audio, and/or videos provided or presented via one or more feeds associated with the social networking system.

Under conventional approaches specifically arising in the realm of computer technology, users may be provided or presented with various content items that are substantially or undesirably lacking in diversity. For example, when content items from the same content provider (e.g., the same author) are presented to a particular user in accordance with conventional approaches, those content items from the same content provider can be considered by the particular user to be less interesting or relevant. Accordingly, conventional approaches specifically arising in the realm of computer technology can, in many instances, be inefficient, ineffective, or undesirable. As such, conventional approaches can create challenges for or reduce the overall experience associated with utilizing, accessing, or interacting with content, such as media content.

SUMMARY

Various embodiments of the present disclosure can include systems, methods, and non-transitory computer readable media configured to acquire a set of properties associated with a set of content items. A plurality of property combinations can be selected from the set of properties. A plurality of numbers of unique properties associated with the plurality of property combinations can be determined. A diversity metric for the set of content items can be generated based on at least some of the plurality of numbers of unique properties associated with the plurality of property combinations.

In an embodiment, the set of content items can be ranked based on an order produced from one or more content ranking algorithms. The set of properties can be representable as a series of properties based on the order.

In an embodiment, the plurality of property combinations can be selected to represent differing segments of the series of properties.

In an embodiment, determining the plurality of numbers of unique properties associated with the plurality of property combinations can further comprise identifying one or more sets of property combinations that are each associated with a respective segment length. One or more minimum numbers of unique properties associated with the one or more sets can be determined. Each of the one or more minimum numbers of unique properties can be determined for each of the one or more sets. The plurality of numbers of unique properties can include the one or more minimum numbers of unique properties.

In an embodiment, generating the diversity metric for the set of content items can further comprise producing one or more normalized values based on dividing each of the one or more minimum numbers of unique properties by the respective segment length associated with each of the one or more sets. A sum of the one or more normalized values can be generated. The sum can be divided by a total segment length associated with the series of properties to produce a resulting value. The diversity metric can be based on the resulting value.

In an embodiment, the plurality of property combinations can be selected such that each of the plurality of property combinations includes a respective unique property from the set of properties.

In an embodiment, determining the plurality of numbers of unique properties associated with the plurality of combinations of properties can further comprise identifying a respective quantity of times each unique property is present in the set of properties. The plurality of numbers can include the respective quantity of times for each unique property.

In an embodiment, generating the diversity metric for the set of content items can further comprise producing a respective probability value for each unique property based on dividing the respective quantity of times for each unique property by a total amount of properties in the set of properties. An entropic value can be calculated based on the respective probability value for each unique property. The diversity metric can be based on the entropic value.

In an embodiment, the set of properties can include at least one of an author, a topic, a tag, a location, an object, or a classification.

In an embodiment, at least one of: 1) a ranking, based on the diversity metric, for at least some content items out of the set of content items for presentation in a feed or 2) a comparison of the diversity metric with another diversity metric generated for another set of content items, can be performed.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 3B illustrates an example scenario associated with evaluating diversity of content based on content properties, according to an embodiment of the present disclosure.

FIG. 3C illustrates an example scenario associated with evaluating diversity of content based on content properties, according to an embodiment of the present disclosure.

FIG. 3D illustrates an example scenario associated with evaluating diversity of content based on content properties, according to an embodiment of the present disclosure.

Figure 1:
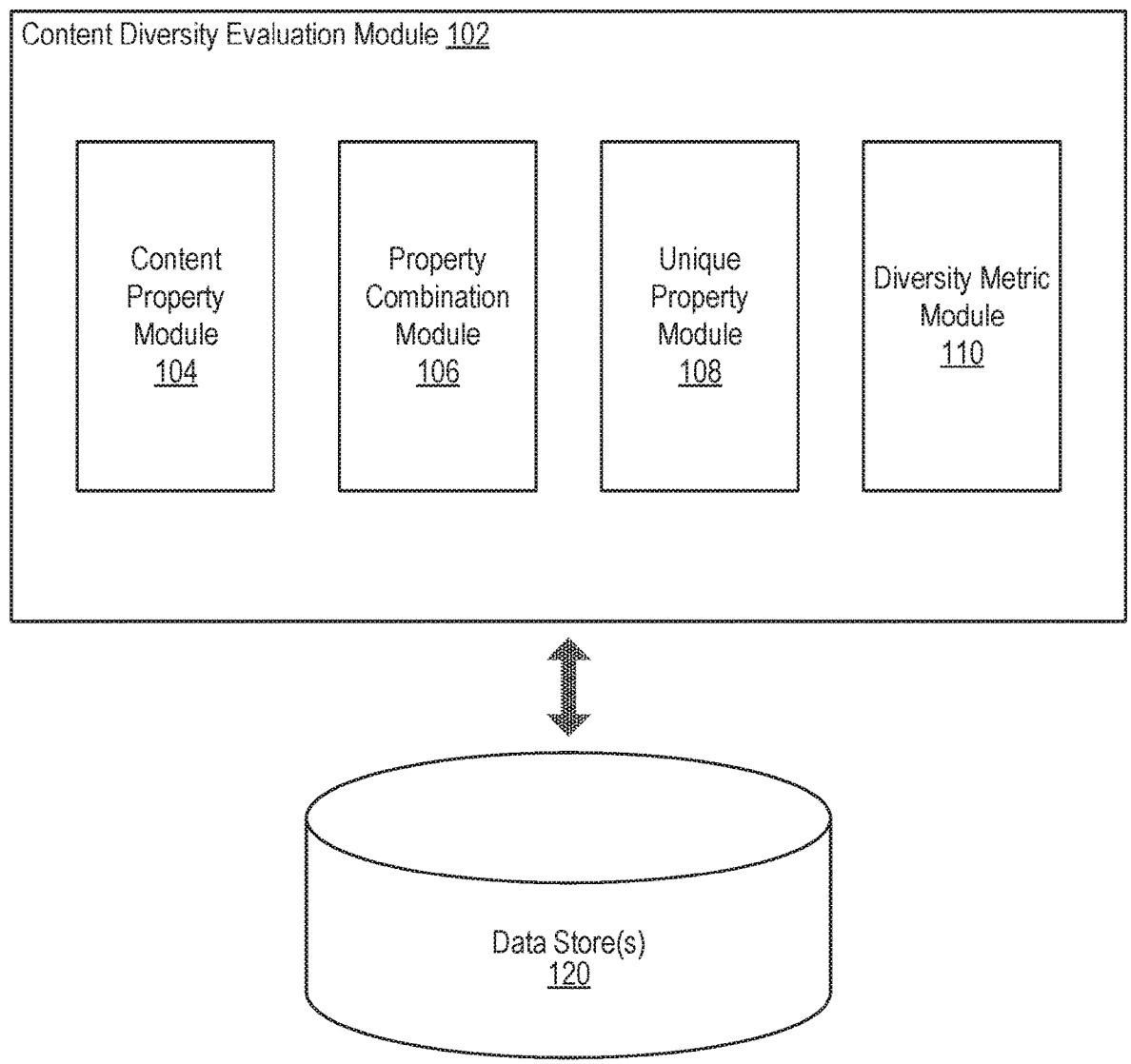
FIG. 1 illustrates an example system including an example content diversity evaluation module configured to facilitate evaluating diversity of content based on content properties, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein. It should be understood that all examples herein are provided for illustrative purposes and that there can be many variations or other possibilities associated with the disclosed technology.

DETAILED DESCRIPTION

Evaluating Diversity of Content Based on Content Properties

People use computing systems (or devices) for various purposes. Users can utilize their computing systems to establish connections, engage in communications, interact with one another, and/or interact with various types of content. In some cases, computing devices can be utilized by users of an online resource, such as a social networking system (or service). In one example, users of the social networking system can access content within the social networking system via computing devices. In this example, the users can interact or otherwise engage with content items (e.g., posts, stories, etc.) provided via one or more feeds of the social networking system, such as by viewing, accessing, supporting (e.g., liking, up-voting, etc.), sharing, saving (e.g., bookmarking, downloading, etc.), commenting on, and/or clicking on such content items.

Conventional approaches specifically arising in the realm of computer technology can surface, present, or otherwise provide content to users (e.g., viewers) for viewing or accessing. In some instances, for a particular user of a social networking system, conventional approaches can present content items posted or shared by one or more social networking connections of the particular user (e.g., friends of the particular user, users to whom the particular user is subscribed, etc.). In one example, conventional approaches may provide to the particular user multiple content items provided by the same content provider (e.g., the same author, the same posting user, etc.), such as by consecutively presenting many posts from the same author. However, this can decrease the likelihood that the particular user would find the provided content items to be interesting or relevant. Moreover, conventional approaches specifically arising in the realm of computer technology can, in many cases, be inaccurate, inefficient, ineffective, or unreliable for evaluating, measuring, or quantifying diversity with respect to content that is provided for viewing or accessing.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can evaluate diversity of content based on content properties. Various embodiments of the present disclosure can acquire a set of properties associated with a set of content items. A plurality of property combinations can be selected from the set of properties. A plurality of numbers of unique properties associated with the plurality of property combinations can be determined. A diversity metric for the set of content items can be generated based on at least some of the plurality of numbers of unique properties associated with the plurality of property combinations. It is contemplated that there can be many variations and/or other possibilities associated with the disclosed technology.

FIG. 1 illustrates an example system 100 including an example content diversity evaluation module 102 configured to facilitate evaluating diversity of content based on content properties, according to an embodiment of the present disclosure. As shown in the example of FIG. 1, the content diversity evaluation module 102 can include a content property module 104, a property combination module 106, a unique property module 108, and a diversity metric module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the content diversity evaluation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content diversity evaluation module 102 can be implemented, in part or in whole, as software running on one or more computing devices or systems, such as on a user or client computing device. For example, the content diversity evaluation module 102 or at least a portion thereof can be implemented as or within an application (e.g., app), a program, an applet, or an operating system, etc., running on a user computing device or a client computing system, such as the user device 610 of FIG. 6. In another example, the content diversity evaluation module 102 or at least a portion thereof can be implemented using one or more computing devices or systems which can include one or more servers, such as network servers or cloud servers. In some instances, the content diversity evaluation module 102 can, in part or in whole, be implemented within or configured to operate in conjunction with a social networking system (or service), such as the social networking system 630 of FIG. 6. It should be appreciated that there can be many variations or other possibilities.

The content property module 104 can be configured to facilitate acquiring a set of properties associated with a set of content items. In some cases, the set of content items can correspond to posts, stories, updates, or other content (e.g., media content) selected for potential presentation to at least one user. For instance, the at least one user can include a user of a social networking system who can view, interact with, or otherwise access a content feed (e.g., a news feed). In this instance, the set of content items can be selected or identified for possible presentation to the user via the content feed.

In some cases, the set of content items can be ranked based on an order produced from one or more content ranking algorithms. For example, a social networking system can utilize the one or more content ranking algorithms to rank or sort the set of content items based on potential interest or relevance (e.g., calculated interest/relevancy confidence scores) with respect to a particular user of the social networking system. In this example, the set of content items can be presented in the ranked or sorted order to the particular user via a content feed. It follows that, in some instances, the set of properties associated with the set of content items can be representable as a series of properties based on the order.

In some embodiments, the set of properties associated with the set of content items can include at least one of an author, a topic, a tag, a location, an object, or a classification, etc., which can be detected, determined, identified, received, retrieved, or otherwise acquired by the content property module 104. In one example, the set of properties can include a set of authors, such that each content item in the set of content items is authored, created, shared, or provided by a respective author in the set of authors. For instance, an ordered set of content items can include Content Item A, Content Item B, Content Item D, and Content Item C. Content Item A, Content Item B, Content Item D, and Content Item C can be respectively provided by Author X, Author Z, Author X, and Author Y. In this instance, Content Item A and Content Item D can be two separate content items, but can be provided by the same author, Author X. The set of properties (e.g., authors) can, in this instance, be representable as a series: XZXY. In another example, the set of properties can include various subsets of properties (e.g., authors, topics, tags, locations, objects, classifications, etc.), each subset of properties being associated with a respective content item in the set of content items. It is contemplated that all examples herein are provided for illustrative purposes and that there can be many variations or other possibilities associated with the disclosed technology.

Moreover, the property combination module 106 can be configured to facilitate selecting a plurality of property combinations from the set of properties. In some implementations, the plurality of property combinations can be selected by the property combination module 106 to represent differing segments of the series of properties. In one example, given a series of properties XZXY, the property combination module 106 can select the plurality of property combinations to include four property combinations representing four segments of differing segment lengths: X, XZ, XZX, and XZXY. A first property combination can include X, a second property combination can include XZ, a third property combination can include XZX, and a fourth property combination can include XZXY. In another example, given the series of properties XZXY, the property combination module 106 can select the plurality of property combinations to include various property combinations for each differing segment length. In this example, the plurality of property combinations can be selected to include property combinations associated with a first segment length of one (resulting in property combinations: X, Z, X, Y), property combinations associated with a second segment length of two (resulting in property combinations: XZ, ZX, XY), property combinations associated with a third segment length of three (resulting in property combinations: XZX, ZXY), and a property combination associated with a fourth segment length of four (resulting in a property combination: XZXY). The disclosed technology can then utilize the selected plurality of property combinations to facilitate evaluating diversity of content based on content properties.

In some embodiments, the property combination module 106 can select the plurality of property combinations such that each of the plurality of property combinations includes a respective unique property from the set of properties. For example, given a set of properties XZXY, the property combination module 106 can select the plurality of property combinations to include a first property combination: X, a second property combination: Z, and a third property combination: Y. The disclosed technology can utilize the selected plurality of property combinations to facilitate evaluating diversity of content based on content properties. Again, it should be appreciated that all examples herein are provided for illustrative purposes and that many variations are possible.

Furthermore, the unique property module 108 can be configured to facilitate determining a plurality of numbers of unique properties associated with the selected plurality of property combinations. In one example, the plurality of numbers of unique properties can include various quantities, counts, and/or other numerical values determined for the unique properties associated with the plurality of property combinations. More details regarding the unique property module 108 will be provided below with reference to FIG. 2A.

Moreover, the diversity metric module 110 can be configured to facilitate generating a diversity metric for the set of content items based on at least some of the plurality of numbers of unique properties associated with the plurality of property combinations. The diversity metric can, for instance, provide an objective or calculated metric for evaluating diversity of content based on content properties. The diversity metric module 110 will be discussed in more detail below with reference to FIG. 2B.

Additionally, in some embodiments, the content diversity evaluation module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the content diversity evaluation module 102. Again, it is contemplated that there can be many variations or other possibilities associated with the disclosed technology.

Figure 2A:
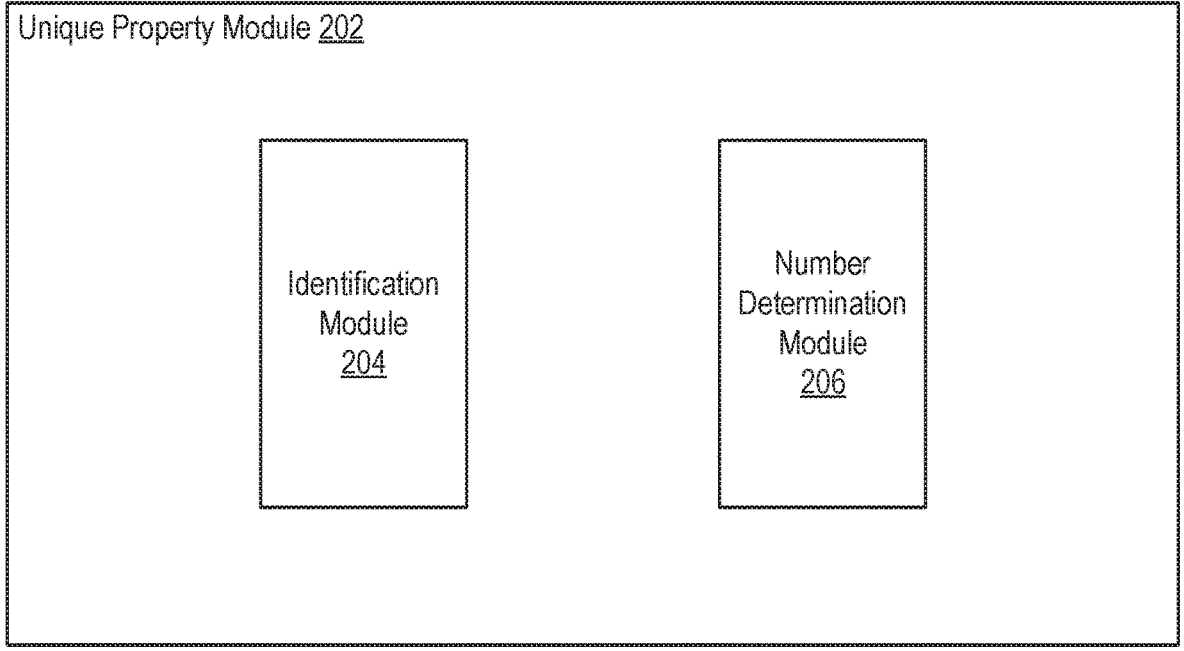
FIG. 2A illustrates an example unique property module configured to facilitate evaluating diversity of content based on content properties, according to an embodiment of the present disclosure.

FIG. 2A illustrates an example unique property module 202 configured to facilitate evaluating diversity of content based on content properties, according to an embodiment of the present disclosure. In some embodiments, the unique property module 108 of FIG. 1 can be implemented as the example unique property module 202. As shown in FIG. 2A, the unique property module 202 can include an identification module 204 and a number determination module 206.

As discussed previously, the unique property module 202 can be configured to facilitate determining a plurality of numbers of unique properties associated with a selected plurality of property combinations. In some implementations, the plurality of property combinations can be selected to represent differing segments of a series of properties, as discussed. The unique property module 202 can utilize the identification module 204 to identify one or more sets of property combinations that are each associated with a respective segment length. In one instance, given a series XZXY, the identification module 204 can identify four sets of property combinations of differing segment lengths: X, XZ, XZX, and XZXY. In another instance, given the series XZXY, the identification module 204 can identify four sets of property combinations of differing segment lengths, such that the first set includes four subsets: X, Z, X, Y, the second set includes three subsets: XZ, ZX, XY, the third set includes two subsets: XZX, ZXY, and the fourth set includes one subset XZXY.

In some embodiments, the number determination module 206 can determine one or more numbers of unique properties associated with the one or more sets. In one instance, given four sets of property combinations: X, XZ, XZX, and XZXY, the number determination module 206 can determine a first number of unique properties equal to one for the first set of property combinations: X, a second number of unique properties equal to two for the second set of property combinations: XZ, a third number of unique properties equal to two for the third set of property combinations: XZX, and a fourth number of unique properties equal to three for the fourth set of property combinations: XZXY. In this instance, the disclosed technology can then utilize the first, second, third, and fourth numbers of unique properties to evaluate content diversity.

Moreover, in some embodiments, the number determination module 206 can determine one or more minimum numbers of unique properties associated with the one or more sets. In some cases, the plurality of numbers of unique properties can include the one or more minimum numbers of unique properties. In one example, four sets of property combinations of differing segment lengths can be selected or identified, such that the first set includes four subsets: X, Z, X, Y, the second set includes three subsets: XZ, ZX, XY, the third set includes two subsets: XZX, ZXY, and the fourth set includes one subset XZXY. Each of the one or more minimum numbers of unique properties can be determined, by the number determination module 206, for each of the one or more sets (e.g., the four sets including the subsets). In this example, the number determination module 206 can determine a first minimum number of unique properties equal to one (minimum of 1, 1, 1, and 1) for the first set of property combinations including the four subsets (X, Z, X, Y), a second minimum number of unique properties equal to two (minimum of 2, 2, and 2) for the second set of property combinations including the three subsets (XZ, ZX, XY), a third minimum number of unique properties equal to two (minimum of 2 and 3) for the third set of property combinations including the two subsets (XZX, ZXY), and a fourth minimum number of unique properties equal to three (minimum of 3) for the fourth set of property combinations including the one subset (XZXY). In this example, the disclosed technology can then utilize the first, second, third, and fourth minimum numbers of unique properties to evaluate content diversity. It is contemplated that all examples herein are provided for illustrative purposes and that many variations associated with the disclosed technology are possible.

Furthermore, in some embodiments, the plurality of property combinations can be selected such that each of the plurality of property combinations includes a respective unique property from the set of properties, as discussed above. For example, given the set of properties: X, Z, X, Y, the plurality of property combinations can be selected to include three property combinations: X, Z, Y. The unique property module 202 can determine the plurality of numbers of unique properties associated with the selected plurality of property combinations based on utilizing the identification module 204 to identify a respective quantity of times each unique property is present in the set of properties. The plurality of numbers can include the respective quantity of times for each unique property. In this example, given the three property combinations: X, Z, Y, the identification module 204 can identify a first quantity of times equal to two for when X is present in the set of properties, a second quantity of times equal to one for when Z is present in the set of properties, and a third quantity of times equal to one for when Y is present in the set of properties. Again, there can be many variations or other possibilities associated with the disclosed technology.

Figure 2B:
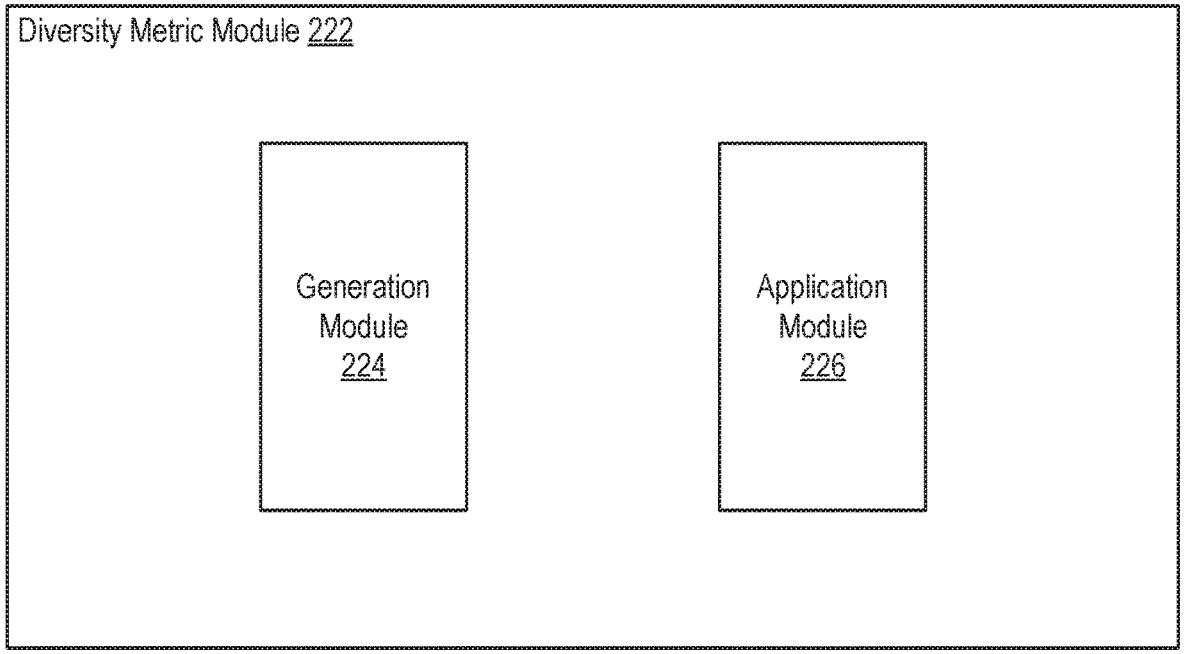
FIG. 2B illustrates an example diversity metric module configured to facilitate evaluating diversity of content based on content properties, according to an embodiment of the present disclosure.

FIG. 2B illustrates an example diversity metric module 222 configured to facilitate evaluating diversity of content based on content properties, according to an embodiment of the present disclosure. In some embodiments, the diversity metric module 110 of FIG. 1 can be implemented as the example diversity metric module 222. As shown in FIG. 2B, the example diversity metric module 222 can include a generation module 224 and an application module 226.

The diversity metric module 222 can be configured to facilitate generating a diversity metric for a given set of content items based on at least some of a determined plurality of numbers of unique properties associated with a selected plurality of property combinations, as discussed previously. The diversity metric module 222 can utilize the generation module 224 to generate the diversity metric for the set of content items based on at least some of the plurality of numbers of unique properties associated with the plurality of property combinations. In some embodiments, the generation module 224 can generate the diversity metric by performing various mathematical operations with respect to at least some of the plurality of numbers of unique properties, such as by summing up the plurality of numbers of unique properties.

Moreover, in some implementations, as discussed above, a set of properties associated with the set of content items can be representable as a series of properties. The plurality of property combinations can be selected to represent differing segments of the series of properties. One or more sets of property combinations that are each associated with a respective segment length can be identified. The determined plurality of numbers of unique properties associated with the one or more sets of property combinations can include one or more minimum numbers of unique properties. The generation module 224 can then produce one or more normalized values based on dividing each of the one or more minimum numbers of unique properties by the respective segment length associated with each of the one or more sets. The generation module 224 can also generate a sum of the one or more normalized values. The generation module 224 can further divide the sum by a total segment length associated with the series of properties to produce a resulting value. In some instances, the diversity metric can correspond to or otherwise be based on the resulting value.

Additionally, in some embodiments, the plurality of property combinations can be selected such that each of the plurality of property combinations includes a respective unique property from the set of properties, as discussed. A respective quantity of times each unique property is present in the set of properties can be identified. The plurality of numbers can include the respective quantity of times for each unique property. The generation module 224 can then produce a respective probability value for each unique property based on dividing the respective quantity of times for each unique property by a total amount of properties in the set of properties. The generation module 224 can further calculate an entropic value based on the respective probability value for each unique property. In some cases, the diversity metric can correspond to or otherwise be based on the entropic value.

Furthermore, the diversity metric module 222 can utilize the application module 226 to perform one or more applications based on the generated diversity metric. For instance, the application module 226 can perform a ranking, based on the diversity metric, for at least some content items out of the set of content items for presentation in a feed. In another instance, the application module 226 can perform a comparison of the diversity metric with another diversity metric generated for another set of content items, which can be ranked, sorted, or ordered based on another ranking algorithm(s). As discussed, all examples herein are provided for illustrative purposes and many variations are possible.

Figure 3A:
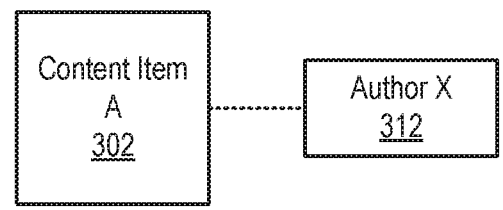
FIG. 3A illustrates an example scenario associated with evaluating diversity of content based on content properties, according to an embodiment of the present disclosure.
Figure 3A:
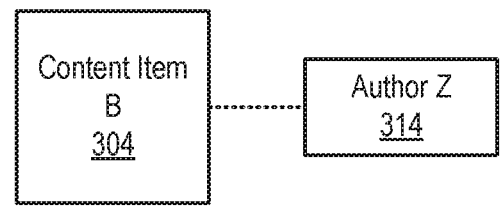
Figure 3A:
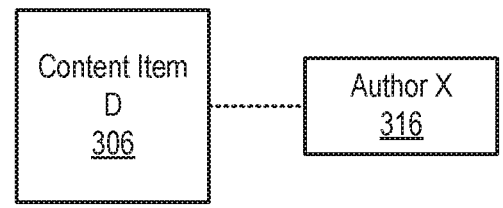
Figure 3A:
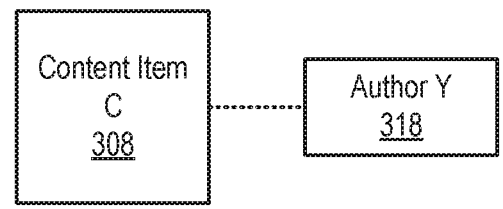

FIG. 3A illustrates an example scenario 300 associated with evaluating diversity of content based on content properties, according to an embodiment of the present disclosure. As shown in the example scenario 300, there can be a set of content items and a set of associated properties. In some cases, the set of content items can be ranked based on an order produced from one or more content ranking algorithms, such as a feed content relevance/interest ranking algorithm for a particular user who may view or otherwise access the set of content items. The set of properties can be representable as a series of properties based on the order. In this example, the ordered set of content items can correspond to Content Item A 302, Content Item B 304, Content Item D 306, and Content Item C 308, and the set of properties can correspond to a respective series of authors including Author X 312, Author Z 314, Author X 316, and Author Y 318. The disclosed technology can facilitate evaluating diversity for the ordered set of content items (A, B, D, C) based on their associated series of authors (X, Z, X, Y).

FIG. 3B illustrates an example scenario 320 associated with evaluating diversity of content based on content properties, according to an embodiment of the present disclosure. In the example scenario 320, given a set of properties such as a series of authors (X, Z, X, Y), the disclosed technology can select a plurality of author combinations 324 based on different segment lengths 322. In this example, a first author combination having a segment length of one can be selected as X, a second author combination having a segment length of two can be selected as XZ, a third author combination having a segment length of three can be selected as XZX, and a fourth author combination having a segment length of four can be selected as XZXY.

Moreover, a plurality of numbers of unique authors 326 associated with the plurality of author combinations can be determined. In this example, a first number of unique authors for X can be determined to be one, a second number of unique authors for XZ can be determined to be two, a third number of unique authors for XZX can be determined to be two, and a fourth number of unique authors for XZXY can be determined to be three. In some cases, the disclosed technology can generate a diversity metric for the set of authors (and their associated content items) by summing up the plurality of numbers of unique authors. In this example, the diversity metric can correspond to 8. In comparison, another set of authors corresponding to XZZX can, for instance, be determined based on this example approach to have a diversity metric of 7 (e.g., the sum of one, two, two, and two), which indicates that XZZX can be considered to be less diverse than XZXY. Again, all examples herein are provided for illustrative purposes and many variations are possible.

FIG. 3C illustrates an example scenario 340 associated with evaluating diversity of content based on content properties, according to an embodiment of the present disclosure. As shown, given the set or series of authors XZXY, the disclosed technology can select a plurality of author combinations 342, such as based on differing segment lengths. In this example scenario 340, a first set of author combinations can be selected, based on a segment length of one, to include X, Z, X, and Y. A second set of author combinations can be selected, based on a segment length of two, to include XZ, ZX, and XY. A third set of author combinations can be selected, based on a segment length of three, to include XZX and ZXY. A fourth set of author combinations can be selected, based on a segment length of four, to include XZXY. Numbers of unique authors 344 can be determined for the plurality of author combinations. Minimum numbers of unique authors 346 can be derived, based on the numbers of unique authors, for each set of author combinations. In this example, a first minimum number of unique authors for the first set of author combinations can be 1 (minimum of 1, 1, 1, and 1). A second minimum number of unique authors for the second set can be 2 (minimum of 2, 2, and 2). A third minimum number of unique authors for the third set can be 2 (minimum of 2 and 3). A fourth minimum number of unique authors for the fourth set can be 3 (minimum of 3).

In some cases, the disclosed technology can generate a diversity metric based on the minimum numbers of unique authors. For instance, the disclosed technology can produce normalized values based on dividing each of the minimum numbers of unique authors by a respective segment length associated with each of the author combination sets, can generate a sum of the normalized values, and can divide the sum by a total segment length associated with the series of authors to produce the diversity metric. In this example, the normalized values can be 1/1, 2/2, 2/3, and 3/4. The sum can be approximately 3.42. The sum 3.42 can be divided by 4 to produce a diversity metric of approximately 0.86. As discussed, it should be understood that all examples are illustrative and many variations are possible.

FIG. 3D illustrates an example scenario 360 associated with evaluating diversity of content based on content properties, according to an embodiment of the present disclosure. In the example scenario 360, the disclosed technology can select a plurality of author combinations for a given set or series of authors XZXY such that each of the plurality of author combinations includes a respective unique author from the set/series of authors. In this example, the unique authors 362 can be determined to be X, Z, and Y. The disclosed technology can also identify a respective quantity of times 364 each unique author is present in the set of authors. The disclosed technology can further produce respective probability values 366 for the unique authors based on dividing the respective quantity of times for each unique author by a total amount of authors in the set of authors. An entropic value can be calculated based on the respective probability value for each unique author. The diversity metric can correspond to or otherwise be based on the entropic value.

In this example, a first quantity of times X is present in the author set/series can be determined to be 2, a second quantity of times Z is present in the author set/series can be determined to be 1, and a third quantity of times Y is present in the author set/series can be determined to be 1. Moreover, a first probability value for X can be 2/4, a second probability value for Z can be 1/4, and a third probability value for Y can be 1/4. The diversity metric can then be generated based on an entropy calculation utilizing each of the probabilities values. For instance, the entropy calculation can be associated with a formula: $\Sigma$-p log p (where p corresponds to the probability values). Again, it is contemplated that all examples herein are provided for illustrative purposes and that there can be many variations or other possibilities associated with the disclosed technology.

Figure 4:
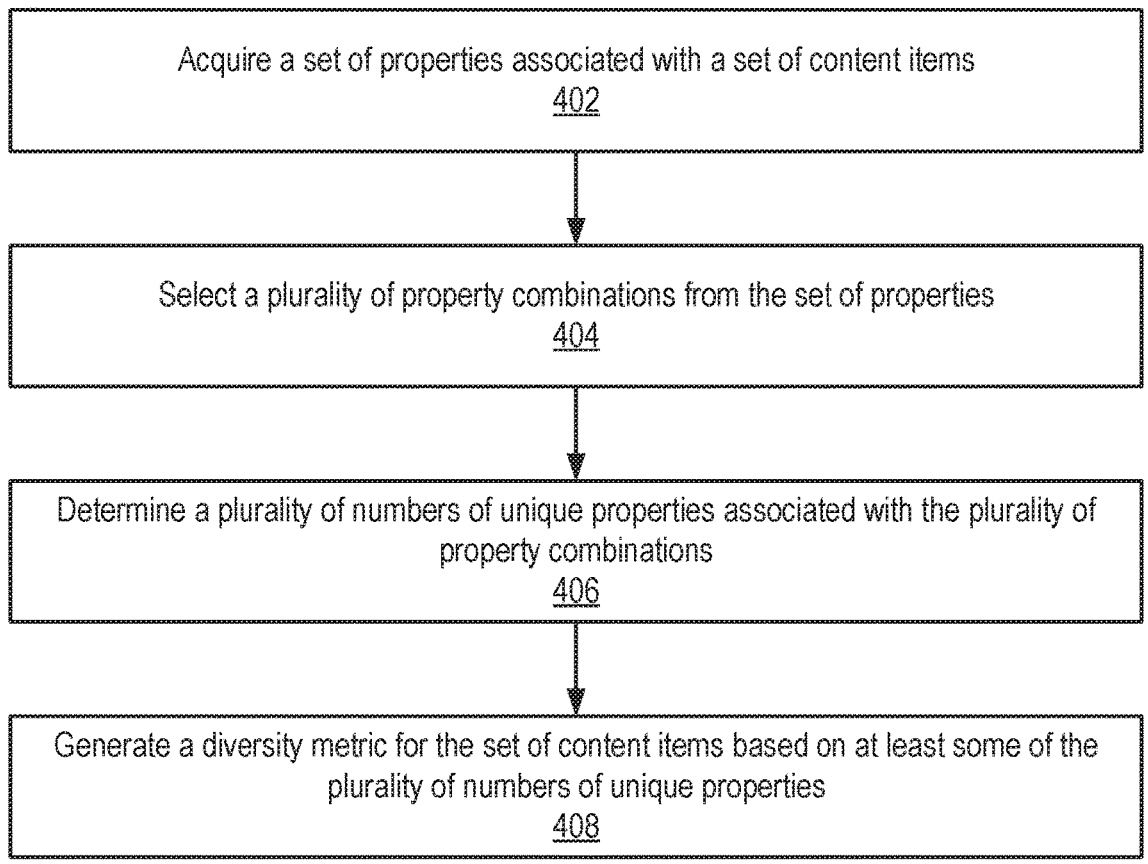
FIG. 4 illustrates an example method associated with evaluating diversity of content based on content properties, according to an embodiment of the present disclosure.

FIG. 4 illustrates an example method 400 associated with evaluating diversity of content based on content properties, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can acquire a set of properties associated with a set of content items. At block 404, the example method 400 can select a plurality of property combinations from the set of properties. At block 406, the example method 400 can determine a plurality of numbers of unique properties associated with the plurality of property combinations. At block 408, the example method 400 can generate a diversity metric for the set of content items based on at least some of the plurality of numbers of unique properties associated with the plurality of property combinations.

Figure 5A:
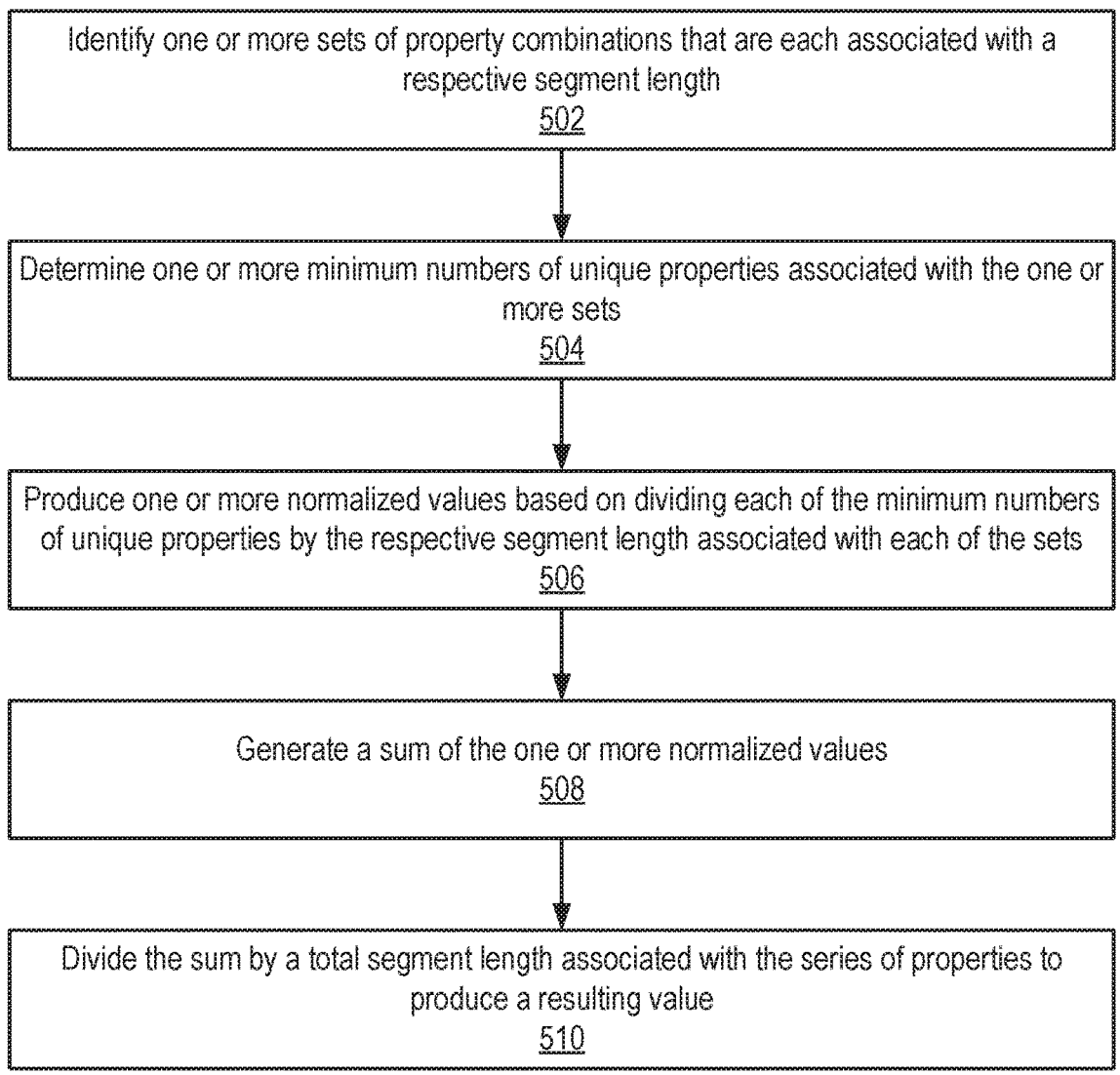
FIGS. 5A-5B illustrate an example method associated with evaluating diversity of content based on content properties, according to an embodiment of the present disclosure.

FIG. 5A illustrates an example method 500 associated with evaluating diversity of content based on content properties, according to an embodiment of the present disclosure. Again, it should be understood that there can be additional, fewer, or alternative steps performed in similar or alternative orders, or in parallel, within the scope of the various embodiments unless otherwise stated.

At block 502, the example method 500 can identify one or more sets of property combinations that are each associated with a respective segment length. At block 504, the example method 500 can determine one or more minimum numbers of unique properties associated with the one or more sets. Each of the one or more minimum numbers of unique properties can be determined for each of the one or more sets. The plurality of numbers of unique properties can include the one or more minimum numbers of unique properties. At block 506, the example method 500 can produce one or more normalized values based on dividing each of the one or more minimum numbers of unique properties by the respective segment length associated with each of the one or more sets. At block 508, the example method 500 can generate a sum of the one or more normalized values. At block 510, the example method 500 can divide the sum by a total segment length associated with the series of properties to produce a resulting value. The diversity metric can be based on the resulting value.

Figure 5B:
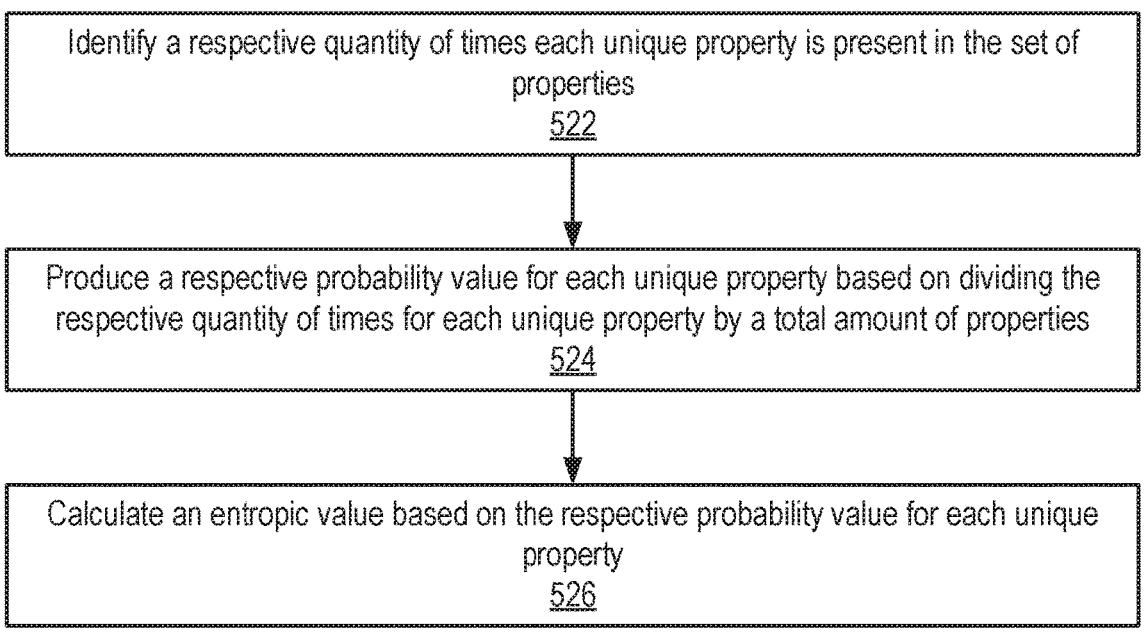

FIG. 5B illustrates an example method 520 associated with evaluating diversity of content based on content properties, according to an embodiment of the present disclosure. As discussed, it should be understood that there can be additional, fewer, or alternative steps performed in similar or alternative orders, or in parallel, within the scope of the various embodiments unless otherwise stated.

At block 522, the example method 520 can identify a respective quantity of times each unique property is present in a set of properties. The plurality of numbers can include the respective quantity of times for each unique property. At block 524, the example method 520 can produce a respective probability value for each unique property based on dividing the respective quantity of times for each unique property by a total amount of properties in the set of properties. At block 526, the example method 520 can calculate an entropic value based on the respective probability value for each unique property. The diversity metric can be based on the entropic value.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
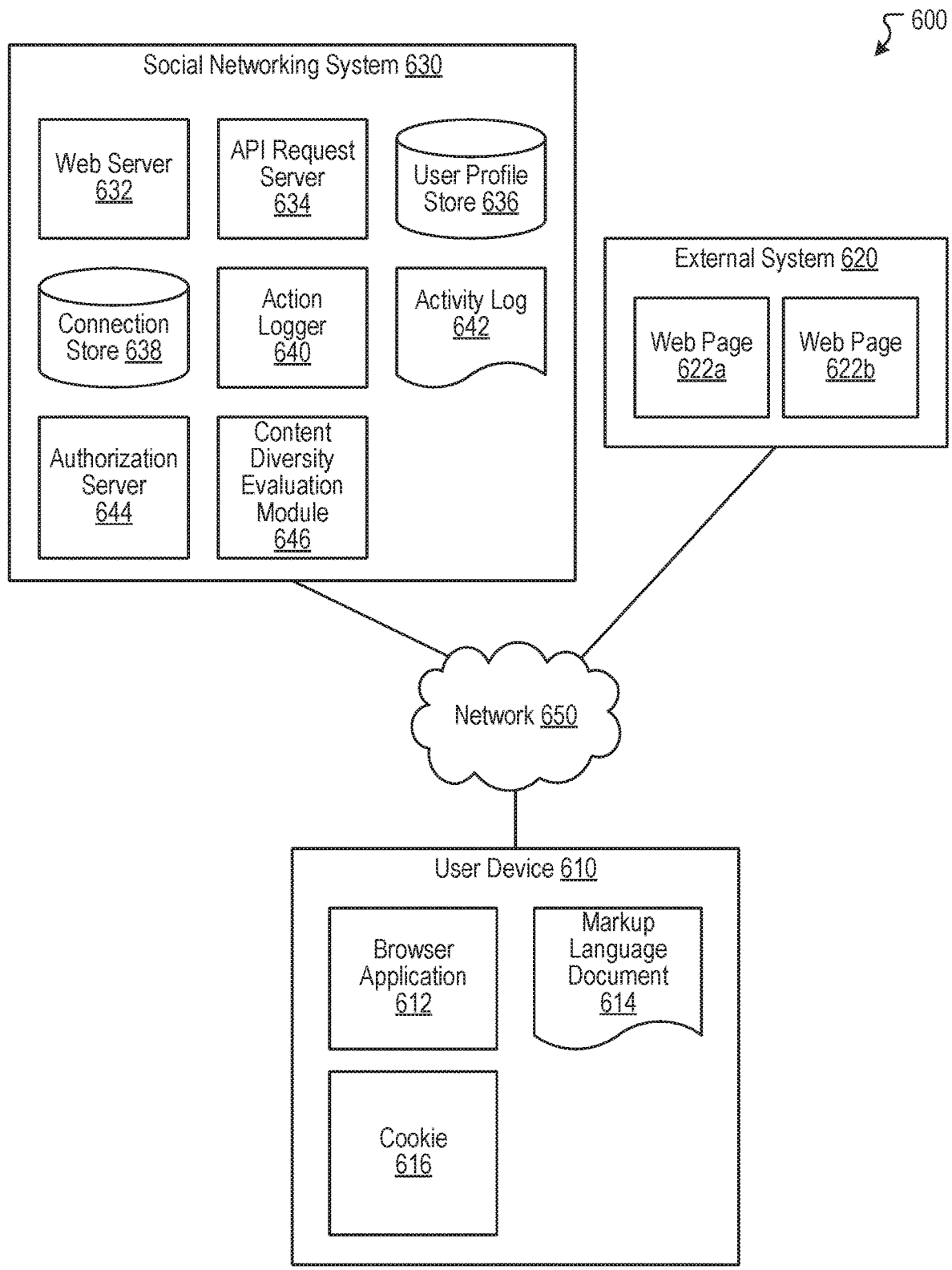
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities.

The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content diversity evaluation module 646. The content diversity evaluation module 646 can, for example, be implemented as the content diversity evaluation module 102 of FIG. 1. As discussed previously, it should be appreciated that there can be many variations or other possibilities associated with the disclosed technology. For example, in some instances, the content diversity evaluation module (or at least a portion thereof) can be included or implemented in the user device 610. Other features of the content diversity evaluation module 646 are discussed herein in connection with the content diversity evaluation module 102.

Hardware Implementation

Figure 7:
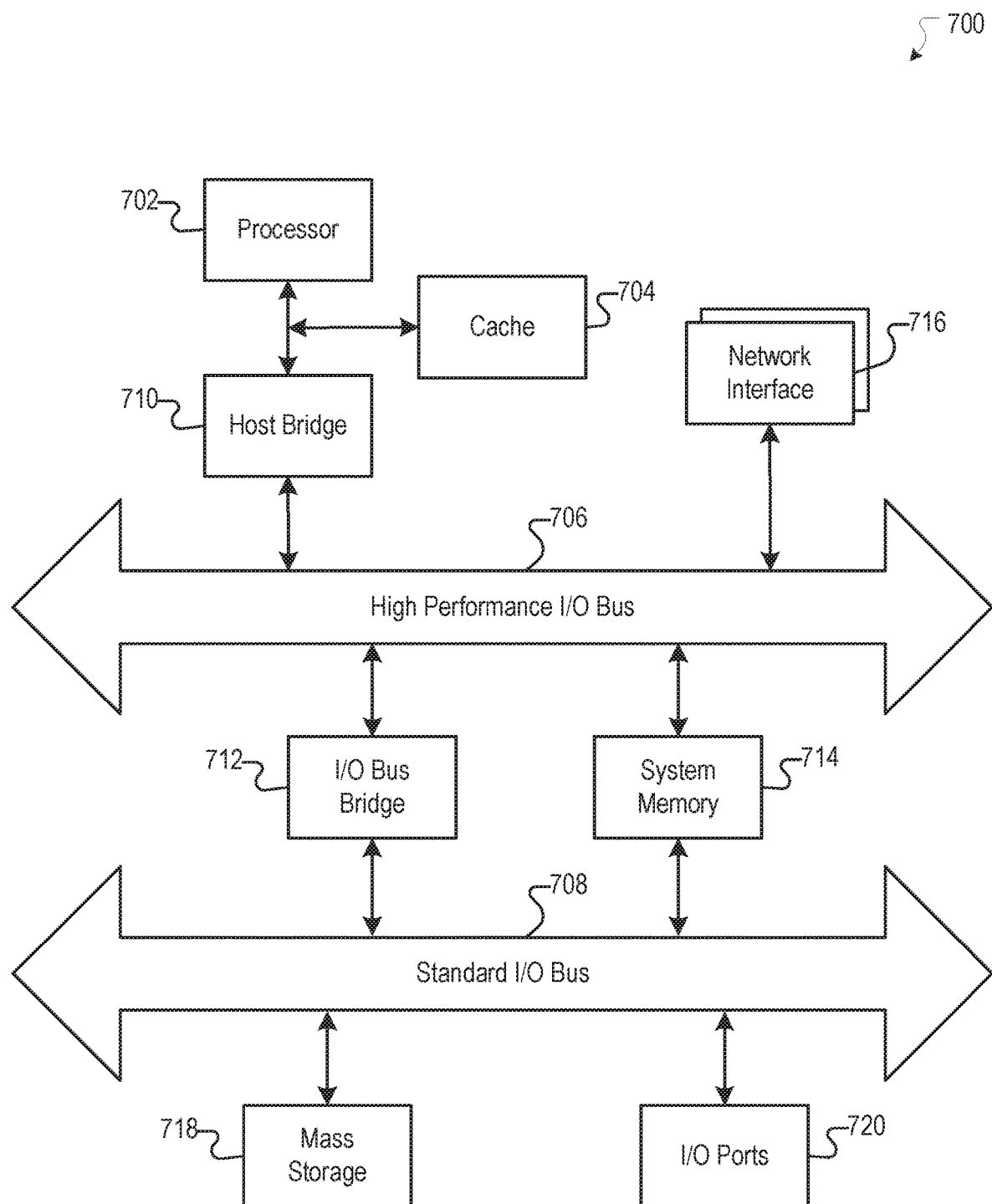
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, a set of properties associated with a set of content items, wherein the set of properties includes at least an author of a content item and a topic of a content item;
    selecting, by the computing system, a plurality of property combinations from the set of properties, wherein the plurality of property combinations are selected such that each of the plurality of property combinations includes a respective unique property from the set of properties including at least an author of a content item and a topic of a content item;
    determining, by the computing system, a plurality of numbers of unique properties associated with the plurality of property combinations selected from the set of properties associated with the set of content items, the determining further comprising:
        identifying, by the computing system, a respective quantity of times each unique property is present in the set of properties, wherein the plurality of numbers includes the respective quantity of times for each unique property;
    generating, by the computing system, a diversity metric for the set of content items based on at least some of the plurality of numbers of unique properties associated with the plurality of property combinations including the respective quantity of times each unique property is present in the set of properties;

comparing, by the computing system, the diversity metric for the set of content items with a diversity metric determined for a second set of content items;

determining, by the computing system, that the set of content items is more diverse in content than the second set of content items based at least in part on the comparison of the diversity metric for the set of content items with the diversity metric for the second set of content items; and performing, by the computing system, a ranking for at least some content items out of the set of content items for presentation in a feed, the ranking being performed based on the diversity metric for the set of content items.

2. The computer-implemented method of claim 1, wherein the set of content items is ranked based on an order produced from one or more content ranking algorithms, and wherein the set of properties is representable as a series of properties based on the order.

3. The computer-implemented method of claim 2, wherein the plurality of property combinations are selected to represent differing segments of the series of properties.

4. The computer-implemented method of claim 3, wherein determining the plurality of numbers of unique properties associated with the plurality of property combinations further comprises:

identifying one or more sets of property combinations that are each associated with a respective segment length; and determining one or more pre-defined minimum numbers of unique properties associated with the one or more sets of property combinations, wherein each of the one or more pre-defined minimum numbers of unique properties is determined for each of the one or more sets of property combinations, and wherein the plurality of numbers of unique properties includes the one or more pre-defined minimum numbers of unique properties.

5. The computer-implemented method of claim 4, wherein generating the diversity metric for the set of content items further comprises:

producing one or more normalized values based on dividing each of the one or more pre-defined minimum numbers of unique properties by the respective segment length associated with each of the one or more sets of property combinations;

generating a sum of the one or more normalized values; and dividing the sum by a total segment length associated with the series of properties to produce a resulting value, wherein the diversity metric is based on the resulting value.

6. The computer-implemented method of claim 1, wherein generating the diversity metric for the set of content items further comprises:

producing a respective probability value for each unique property based on dividing the respective quantity of times for each unique property by a total amount of properties in the set of properties; and calculating an entropic value based on the respective probability value for each unique property, wherein the diversity metric is based on the entropic value.

7. The computer-implemented method of claim 1, wherein the set of properties further includes at least one of a tag, a location, an object, or a classification.

8. A system comprising:

at least one processor; and a memory storing instructions that, when executed by the at least one processor, cause the system to perform:

acquiring a set of properties associated with a set of content items, wherein the set of properties includes at least an author of a content item and a topic of a content item;

selecting a plurality of property combinations from the set of properties, wherein the plurality of property combinations are selected such that each of the plurality of property combinations includes a respective unique property from the set of properties including at least an author of a content item and a topic of a content item;

determining a plurality of numbers of unique properties associated with the plurality of property combinations selected from the set of properties associated with the set of content items, the determining further comprising:

identifying a respective quantity of times each unique property is present in the set of properties, wherein the plurality of numbers includes the respective quantity of times for each unique property;

generating a diversity metric for the set of content items based on at least some of the plurality of numbers of unique properties associated with the plurality of property combinations including the respective quantity of times each unique property is present in the set of properties;

comparing the diversity metric for the set of content items with a diversity metric determined for a second set of content items;

determining that the set of content items is more diverse in content than the second set of content items based at least in part on the comparison of the diversity metric for the set of content items with the diversity metric for the second set of content items; and performing a ranking for at least some content items out of the set of content items for presentation in a feed, the ranking being performed based on the diversity metric for the set of content items.

9. The system of claim 8, wherein the set of content items is ranked based on an order produced from one or more content ranking algorithms, and wherein the set of properties is representable as a series of properties based on the order.

10. The system of claim 9, wherein the plurality of property combinations are selected to represent differing segments of the series of properties.

11. The system of claim 8, wherein the set of properties further includes at least one of a tag, a location, an object, or a classification.

12. A non-transitory computer-readable storage medium including instructions that, when executed by at least one processor of a computing system, cause the computing system to perform a method comprising:

acquiring a set of properties associated with a set of content items, wherein the set of properties includes at least an author of a content item and a topic of a content item;

selecting a plurality of property combinations from the set of properties, wherein the plurality of property combinations are selected such that each of the plurality of property combinations includes a respective unique property from the set of properties including at least an author of a content item and a topic of a content item;

determining a plurality of numbers of unique properties associated with the plurality of property combinations selected from the set of properties associated with the set of content items, the determining further comprising:

identifying a respective quantity of times each unique property is present in the set of properties, wherein the plurality of numbers includes the respective quantity of times for each unique property;

generating a diversity metric for the set of content items based on at least some of the plurality of numbers of unique properties associated with the plurality of property combinations including the respective quantity of times each unique property is present in the set of properties;

comparing the diversity metric for the set of content items with a diversity metric determined for a second set of content items;

determining that the set of content items is more diverse in content than the second set of content items based at least in part on the comparison of the diversity metric for the set of content items with the diversity metric for the second set of content items; and performing a ranking for at least some content items out of the set of content items for presentation in a feed, the ranking being performed based on the diversity metric for the set of content items.

13. The non-transitory computer-readable storage medium of claim 12, wherein the set of content items is ranked based on an order produced from one or more content ranking algorithms, and wherein the set of properties is representable as a series of properties based on the order.

14. The non-transitory computer-readable storage medium of claim 13, wherein the plurality of property combinations are selected to represent differing segments of the series of properties.

15. The non-transitory computer-readable storage medium of claim 12, wherein the set of properties further includes at least one of a tag, a location, an object, or a classification.

\* \* \* \* \*